US012363497B2

(12) United States Patent
Thall et al.

(10) Patent No.: US 12,363,497 B2
(45) **Date of Patent: *Jul. 15, 2025**

(54) 3D AUDIO RENDERING USING VOLUMETRIC AUDIO RENDERING AND SCRIPTED AUDIO LEVEL-OF-DETAIL

(71) Applicant: Apple Inc., Cupertino, CA (US)

(72) Inventors: David Thall, Palo Alto, CA (US); Christopher A. Wolfe, San Jose, CA (US); James E. McCartney, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,671

(22) Filed: Mar. 14, 2024

(65) Prior Publication Data

US 2024/0298136 A1 Sep. 5, 2024

Related U.S. Application Data

(63) Continuation of application No. 17/463,314, filed on Aug. 31, 2021, now Pat. No. 11,950,084, which is a continuation of application No. 16/645,418, filed as application No. PCT/US2018/052478 on Sep. 24, 2018, now Pat. No. 11,146,905.

(60) Provisional application No. 62/566,130, filed on Sep. 29, 2017.

(51) Int. Cl.
*H04S 7/00* (2006.01)

(52) U.S. Cl.
CPC .......... *H04S 7/303* (2013.01); *H04S 2420/01* (2013.01)

(58) Field of Classification Search
CPC . H04S 7/00; H04S 7/302; H04S 7/303; H04S 2420/01
USPC ............................ 381/303, 309, 310; 463/35
See application file for complete search history.

(56) References Cited

U.S. PATENT DOCUMENTS

| | | | |
|---|---|---|---|
| 5,440,639 | A | 8/1995 | Suzuki et al. |
| 5,633,993 | A | 5/1997 | Redmann et al. |
| 6,751,322 | B1 | 6/2004 | Carlbom et al. |

(Continued)

FOREIGN PATENT DOCUMENTS

| | | |
|---|---|---|
| CN | 103323099 | 9/2013 |
| CN | 104054126 | 9/2014 |

(Continued)

OTHER PUBLICATIONS

International Search Report and Written Opinion for International Application No. PCTIUS2018/052478 mailed Dec. 5, 2018, 15 pages.

(Continued)

*Primary Examiner* — Xu Mei
(74) *Attorney, Agent, or Firm* — Aikin & Gallant, LLP

(57) ABSTRACT

An audio engine is provided for acoustically rendering a three-dimensional virtual environment. The audio engine uses geometric volumes to represent sound sources and any sound occluders. A volumetric response is generated based on sound projected from a volumetric sound source to a listener, taking into consideration any volumetric occluders in-between. The audio engine also provides for modification of a level of detail of sound over time based on distance between a listener and a sound source. Other aspects are also described and claimed.

20 Claims, 7 Drawing Sheets

(56) References Cited

U.S. PATENT DOCUMENTS

| | | | | |
|---|---|---|---|---|
| 8,847,965 | B2 | 9/2014 | Chandak et al. | |
| 9,489,948 | B1 | 11/2016 | Chu et al. | |
| 9,510,125 | B2 | 11/2016 | Raghuvanshi et al. | |
| 9,578,440 | B2 | 2/2017 | Otto et al. | |
| 9,794,720 | B1 | 10/2017 | Kadri | |
| 9,807,533 | B2 | 10/2017 | Mehnert et al. | |
| 10,203,839 | B2 * | 2/2019 | Seligmann | G06F 16/63 |
| 11,146,905 | B2 | 10/2021 | Thall et al. | |
| 11,316,966 | B2 | 4/2022 | Coffman et al. | |
| 11,950,084 | B2 * | 4/2024 | Thall | H04S 7/303 |
| 2002/0021302 | A1 | 2/2002 | Lengyel | |
| 2003/0007648 | A1 | 1/2003 | Currell | |
| 2006/0029243 | A1 | 2/2006 | Gerrard et al. | |
| 2006/0247918 | A1 * | 11/2006 | Schmidt | H04S 7/302 704/200 |
| 2009/0251310 | A1 | 10/2009 | Bloebaum | |
| 2009/0262946 | A1 | 10/2009 | Dunko | |
| 2012/0206452 | A1 | 8/2012 | Geisner et al. | |
| 2014/0300636 | A1 | 10/2014 | Miyazaya et al. | |
| 2016/0085305 | A1 | 3/2016 | Spio | |
| 2016/0173049 | A1 | 6/2016 | Mehta | |
| 2016/0183024 | A1 | 6/2016 | Karkkainen et al. | |
| 2016/0358364 | A1 | 12/2016 | Gossens et al. | |
| 2018/0077511 | A1 | 3/2018 | Mehta et al. | |
| 2018/0109900 | A1 | 4/2018 | Lyren et al. | |
| 2019/0121516 | A1 | 4/2019 | Seligmann et al. | |
| 2019/0253691 | A1 | 8/2019 | Ostrover et al. | |

FOREIGN PATENT DOCUMENTS

| | | |
|---|---|---|
| CN | 104604257 | 5/2015 |
| CN | 105323684 | 2/2016 |

OTHER PUBLICATIONS

Durr, Gabriel, et al., "Implementation and Evaluation of Dynamic Level of Audio Detail", AES 56th international Conference, Feb. 11, 2015, 8 pages.

Bencina, Ross, "Implementing Real-Time Granular Synthesis", Aug. 31, 2001, 17 pages.

Tsingos, Nicolas, et al., "Perceptual Audio Rendering of Complex Virtual Environments", ACM Transactions on Graphics, Association for Computing Machinery, 2004, SIGGRAPH Conference Proceedings, 23(3), 11 pages.

Taylor, Micah, et al., "Guided Multiview Ray Tracing for Fast Auralization", IEEE Transactions on Visualization and Computer Graphics, vol. 18, Issue 11, Nov. 2012, 14 pages.

Gallo, Emmanuel, et al., "Efficient 30 Audio Processing with the GPU", REVES/INRIA Sophia-Antipolis, 2004, 1 page.

Funkhouser, Thomas, et al., "A Beam Tracing Approach to Acoustic Modeling for Interactive Virtual Environments", SIGGRAPH '98: Proceedings of the 25th Annual Conference on Computer graphics and interactive techniques, Jul. 1998, 12 pages.

Schissler, Carl, et al., "Interactive Sound Propagation and Rendering for Large Multi-Source Scenes", CM Transactions on Graphics, Article No. 2, Sep. 2016, 12 pages.

International Preliminary Report on Patentability for International Application No. PCT/US2018/052478 mailed Apr. 9, 2020, 8 pages.

Office Action and Search Report for Chinese Application No. 2018800571837 mailed Jan. 29, 2021, 15 pages.

Office Action for Chinese Application No. 2018800571837 mailed Jul. 14, 2021, 5 pages.

Zhang Yang et al., "Present Situation and Development of 3D Audio Technology in Virtual Reality", China Academic Journal Electronic Publishing House, 2017, 8 pages.

Jian et al., "A Fast 3D Acoustic rendering Method", Journal of Image and Graphics, 2003, 6 pages.

Grani et al., "Design and Evaluation of Binaural Auditory Rendering for CAVEs", received from https://www.researchgate.net/publication/268521338_Design_and_Evaluation_of_Binaural_Auditory_Rendering_for_CAVEs, Mar. 29, 2014-Apr. 2, 2014, 3 pages.

Chinese Application No. 2021115964442, "The Patent Office of the Peoples Republic of China, Notification of the First Office Action and Patent Search Report", mailed Nov. 17, 2023, 5 pages.

* cited by examiner

3D AUDIO RENDERING USING VOLUMETRIC AUDIO RENDERING AND SCRIPTED AUDIO LEVEL-OF-DETAIL

RELATED APPLICATIONS

This application is a continuation of co-pending U.S. patent application Ser. No. 17/463,314, filed Aug. 31, 2021, which is a continuation of U.S. application Ser. No. 16/645,418 filed Mar. 6, 2020, now U.S. Pat. No. 11,146,905, issued Oct. 12, 2021, which is a National Stage Entry of International Application No. PCT/US2018/052478 filed Sep. 24, 2018, which claims the benefit of the earlier filing date of U.S. Provisional Application No. 62/566,130 filed on Sep. 29, 2017, which are incorporated herein by reference.

FIELD

The disclosure herein relates to three-dimensional (3D) audio rendering.

BACKGROUND

Computer programmers use 2D and 3D graphics rendering and animation infrastructure as a convenient means for rapid software application development, such as for the development of, for example, gaming applications. Graphics rendering and animation infrastructures may, for example include libraries that allow programmers to create 2D and 3D scenes using complex special effects with limited programming overhead.

One challenge for such graphical frameworks is that graphical programs such as games often require audio features that must be determined in real time based on non-deterministic or random actions of various objects in a scene. Incorporating audio features in the graphical framework often requires significant time and resources to determine how the audio features should change when the objects in a scene change.

With respect to spatial representation of sound in a virtual audio environment (3D audio rendering), current approaches typically represent sound as a point in space. This usually means that an application is required to generate points for each of various sounds that exist in the virtual audio environment. This process is complex, and current approaches are typically ad-hoc.

With respect to synthesis of sound, current approaches attenuate sound as distance between a listener and a sound source in the virtual audio environment increases. In some cases, filtering of the sound is also performed, with the high frequencies of the sound being attenuated more than the low frequencies as the virtual distance to the object that represents the sound source increases.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. Also, in the interest of conciseness and reducing the total number of figures, a given figure may be used to illustrate the features of more than one embodiment, and not all elements in the figure may be required for a given embodiment.

DETAILED DESCRIPTION

Figure 1:
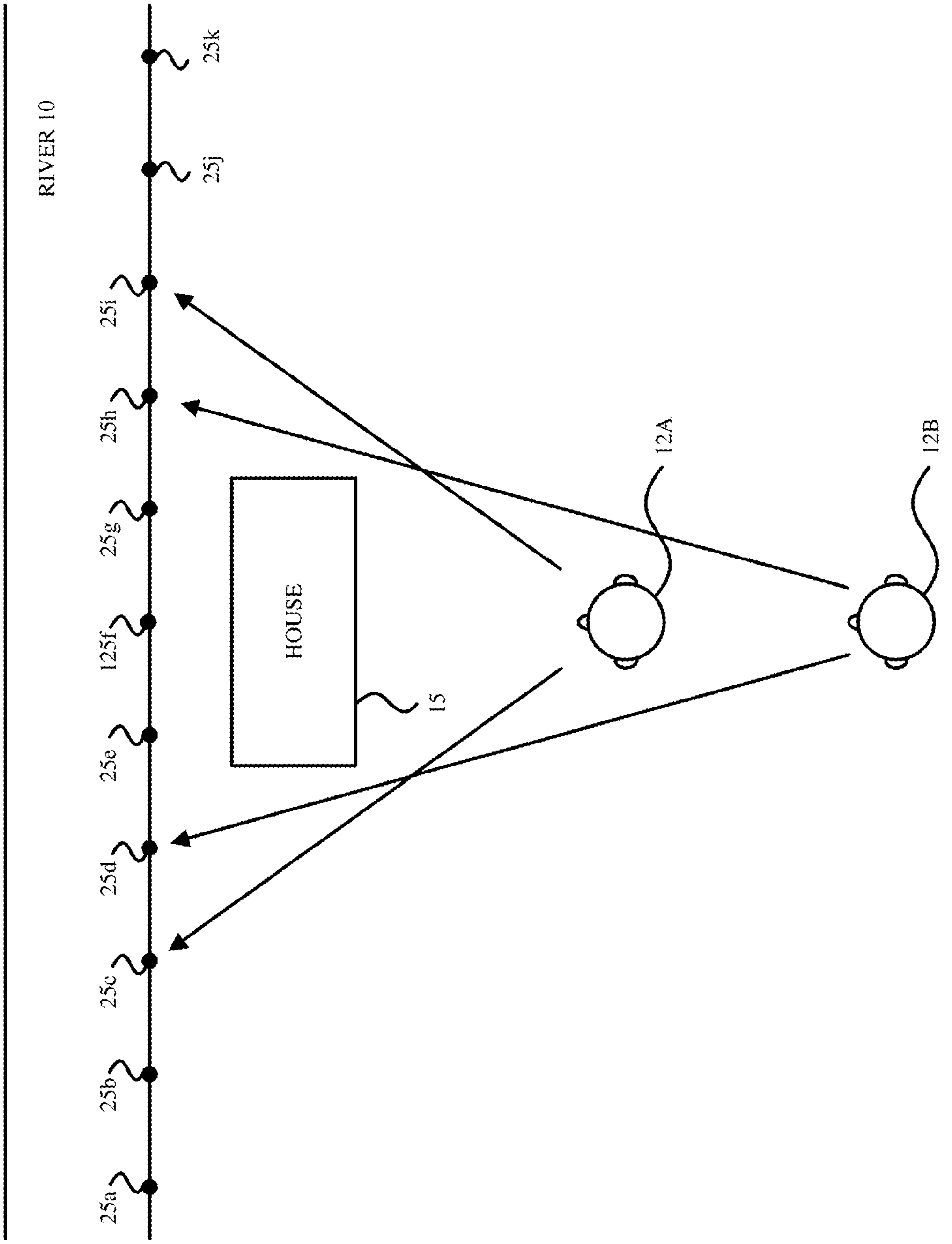
FIGURE 1 (PRIOR ART)
FIG. 1 illustrates a representational view for explaining a three-dimensional (3D) virtual audio environment.

Several embodiments of the invention with reference to the appended drawings are now explained. Whenever aspects are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Volumetric Audio Object

Generally, an embodiment herein aims to represent a sound source in a 3D virtual audio environment as a geometric volume, rather than as a point. In particular, an object in a virtual scene can be defined as having a geometric volume and having a material that is associated with audio characteristics. The material or its associated audio characteristics may indicate that the object is a sound occluder, which does not produce sound, or that the object is a sound producer (source) that does produce sound. It is noted that the sound being considered here is not reverberant sound, but direct path sound that has not reflected off objects in the 3D virtual environment or scene. Thus, it is possible to add, into a virtual scene, sound sources or other objects whose materials define their acoustic properties. This makes it possible for an audio rendering engine, rather than an application program, to use the geometric volume of the object to render a more realistic audio environment (also referred to here as volumetric audio or acoustical rendering, or volumetric response.)

In one aspect, a graphics processing unit (GPU) is dual purposed in that it is also used to perform volumetric audio rendering tasks, in addition to graphics rendering tasks, both of which may be requested in a given application, e.g., a gaming application. This makes it possible to linearize the time-complexity of the audio rendering task, by "looking" at the entire virtual scene all at once, which reduces the time-complexity to O(1)*L, where L is a number of listener perspectives. This also makes it possible to handle occlusion more naturally, via the graphical rendering process and in particular using depth-buffering.

Another embodiment of the invention aims to increase a level of detail (LOD) of sound over time, as a listener moves closer to a sound source in the 3D virtual environment, and to decrease the LOD over time as the listener moves farther from the sound source, rather than merely attenuating or spectrally shaping the sound. In one aspect, a scripting language is provided that describes procedurally how sounds are rendered by the audio system over time. During the scripting process (when a particular script is being authored), sound designers are given a set of metrics related to a level of detail (LOD) of sound. The designer selects from the set of available metrics and sets various parameters of the selected metric, to define a procedure for rendering the sound produced by a particular object. The script is repeatedly performed by the audio engine for each frame (of a sequence of frames that defines the sound in the scene being rendered) to produce the speaker driver signals. These metrics are thus used to iteratively modify the complexity (e.g., granularity) of sound rendering over time, for purposes of sound design and of power consumption or signal processing budget management. These metrics include information such as distance between the sound source and a listener, solid-angle between the sound source and the listener, velocity of the listener relative to the sound source, a "loudness masking amount" of the sound produced by the sound source, and current global signal-processing load. Other metrics may include priority of the sound source relative to other sound sources and the position of the sound source with respect to other objects.

It is for example possible to change the synthesis of sound, or the process by which the sound is synthesized over time, based on the distance between the listener and the sound source. As the listener moves closer to the sound source, synthesis of the sound becomes more complex (e.g., more granular and more detailed) over time, and as the listener moves away from the sound source, synthesis of the sound becomes less complex over time. This yields an audio rendering process that can smoothly and continuously modify the level of detail of individual sounds, in an interactive virtual environment, relative to both time and space.

FIG. 1 is a representational top view for explaining a three-dimensional (3D) virtual audio environment. In a direct-path sound source rendering approach, it is determined if a sound source (e.g., river 10) can be heard by a listener (e.g., listener 12A, listener 12B). This process typically entails deep knowledge of the scene and its hierarchy. Most conventional approaches repeatedly run a line-of-sight (LOS) test, firing rays from the source to the listener while traversing the scene-graph. If at any point a ray intersects an object (e.g., a sphere, bounding-box or mesh), the sound source's direct-path contribution is marked as occluded. FIG. 1 shows such an example object, as house 15. The cost of traversing the entire scene hierarchy ranges from moderate to extreme, depending on the scene's size and complexity. Simplified shapes are usually employed to minimize the ray-vs-shape calculations.

To improve realism, some approaches use ray-vs-mesh calculations. In that case, runtime complexity is usually O(T*S)*L, where T is a number of triangles in the mesh, S is a number of sound sources, and L is a number of listener perspectives. Therefore, a single mesh with 1000 triangles, 1 source and 1 listener perspective requires 1000 intersection tests. Current approaches to simulating a volumetric source typically involve tracking the single closest point on a sound source and consider that as the source position of the associated sound. Points may be represented, for example, by XYZ coordinates indicating a location in the virtual environment. Some current approaches approximate the shape or volume of a sound source with multiple point sources. For example, a box source may be approximated with 8 point sources (e.g., one for each vertex). However, that simple modification may increase the number of intersection tests by a factor of 8, totaling 8000 ray-vs-mesh intersection tests. In the example of FIG. 1, river 10 is approximated with points 25 (individually points 25*a-k*). Ray tracing may be performed from a listener to one or more of points 25 of the sound source 10. Since rays from listener 12A to points 25*e-g* intersect house 15, the sound source 10's direct-path contribution from these points is marked as occluded. (Similarly, rays from listener 12B to points 25*e-g* intersect house 15 and sound from points 25*e-g* is marked as occluded). As such, it is necessary for a programmer to be aware of house 15 and the location of house 15 in order to position the sound source point so that the listener can hear the sound associated with river 10.

Thus, in current approaches, sound sources are often spatially represented by one or more points in space, which leads to significant use of time and resources, since an application (executing in a software abstraction layer that is above the audio rendering engine) needs to generate points for each of the various sounds that exist in the virtual environment. In situations where the virtual scene changes, such as a listener moving positions or introduction of another object into the virtual environment, the process needs to be performed again to determine how the audio features should change when the objects in the virtual scene change. Referring again to FIG. 1, as a listener moves from a position further from a sound source (e.g., listener 12B) to a position closer to the sound source (e.g., listener 12A), the points representing the sound source need to be moved farther out relative to the house 15 (e.g., points 25*c* and 25*i*), in order for the sound source to be heard. As the listener moves from a position closer to the sound source (e.g., listener 12A) to a position further from the sound source (e.g., listener 12B) the points need to be moved inward relative to the house 15 (e.g., points 25*d* and 25*h*).

As the listener moves towards and away from the sound source, one may also want to consider how synthesis of the sound should be varied. Current approaches tend to attenuate sound as distance between a listener and a sound source in the virtual environment increases. Volume of the sound may be increased or decreased according to distance. In some cases, filtering of the sound is also performed, with the high frequencies of the sound being attenuated more as distance increases.

Some current approaches use spatial clustering algorithms that replace sounds far-away from a listener with imposters, such as baked recordings or statistical models of spatially-coherent sound phenomena, such as wind in trees or a waterfall splashing into a lake. Current spatial clustering approaches often have several problems. First, spatial clustering limits details in sound to spatially-coherent sound phenomena, which leaves many situations unresolved since many interactive virtual environments contain mixtures of unrelated sounds in near proximity. Second, audio rendering applications typically must provide a very complicated signal processing solution that must attempt to blend between the various sounds in a sound cluster without introducing "popping" artifacts, often with many different types of statistical models and rules about blending for different types of sounds.

Figure 2:
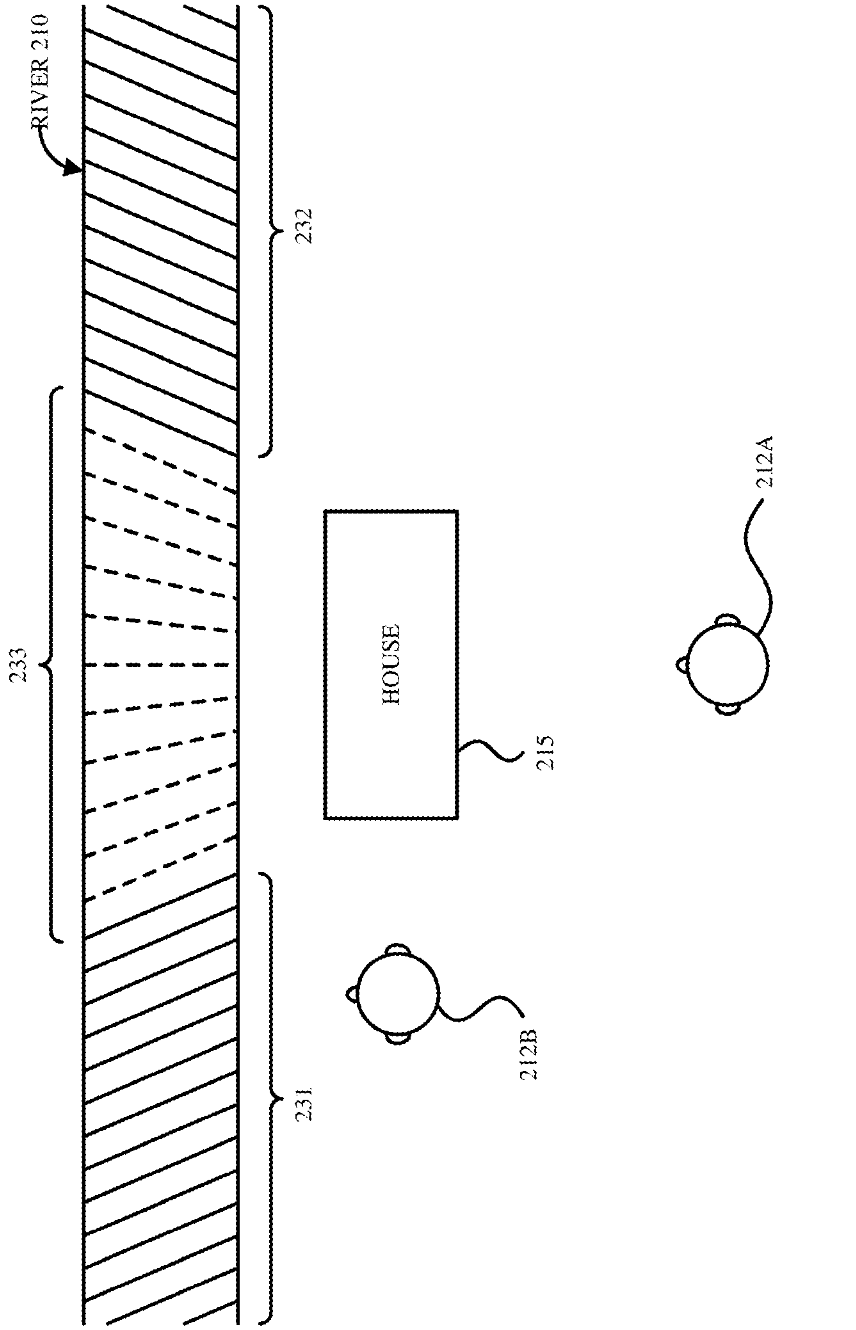
FIG. 2 illustrates a representational view for explaining an example 3D virtual audio environment.

An aspect of the disclosure herein is now described in connection with FIG. 2. In the example of FIG. 2, the virtual scene includes two listeners (e.g., listener 212A, listener 212B) and two objects that may be displayed, namely river 210 and house 215. Of course, a virtual scene may include any practical number of objects as well as various types of objects. River 210 is an object that is a sound source, which is represented volumetrically in the 3D virtual environment. Thus, instead of being configured to produce sound from one or more discrete points that constitute the object (as in FIG. 1), river 210 is said to produce sound from the surface of the entire volume of the shape that represents it. House 215 is a sound occluding object that occludes sounds from river 210 to the listener 212A. House 215 is also represented volumetrically in the 3D virtual environment.

Figure 3A:
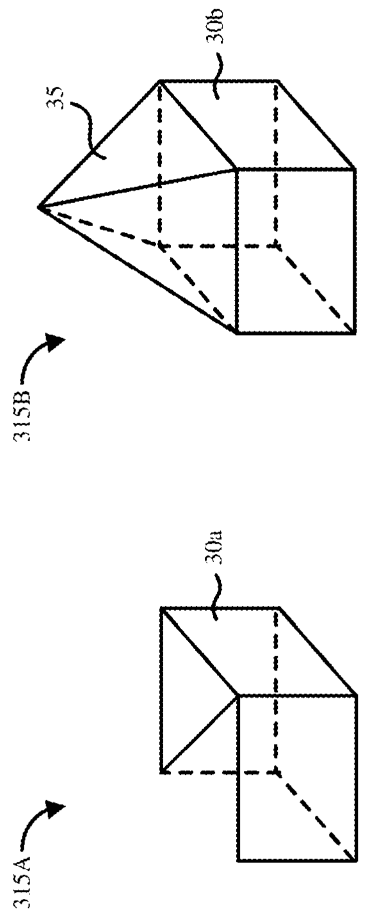
FIG. 3A illustrates representational views for explaining example objects having geometric volumes.

FIG. 3A shows example geometric volumes that may be used to represent an object, such as house 215. As shown in FIG. 3A, the geometric volume of object 315A may be represented by shape 30*a* illustrated as a cuboid. The geometric volume of object 315B is represented by shapes 30*b* and 35 (e.g., a cuboid and a pyramid, respectively).

Figure 3B:
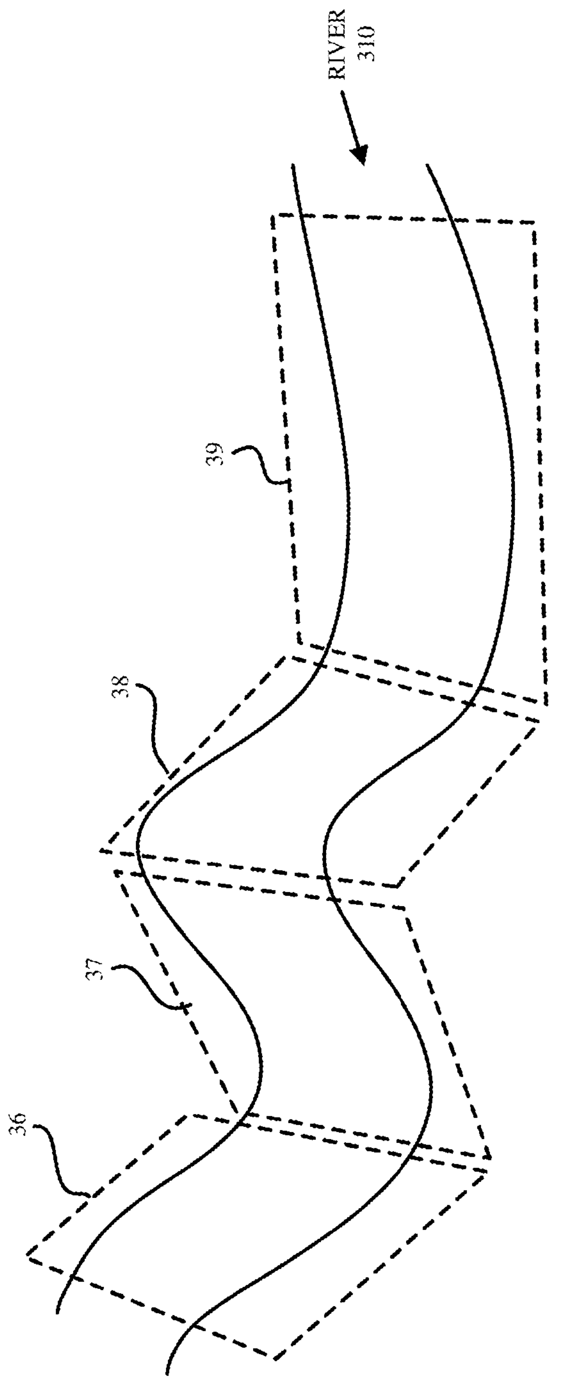
FIG. 3B illustrates a representational view for explaining an example object having simplified bounding volumes.

In the example of FIG. 2, the geometric volume of river 210 is illustrated as a plane. However, a sound producing object such as a river may also have a more complicated shape. FIG. 3B illustrates an example of a river 310 have a winding path. In one aspect, several simplified bounding volumes (e.g., 36, 37, 38, 39) are determined that as a whole or together represent the geometric volume of river 310. Although the volumes 36-39 are not shown as overlapping in FIG. 2, these volumes may in some instances overlap.

Although FIGS. 3A and 3B illustrate several specific shapes as examples used for describing the concepts here that involve geometric volumes, other shapes and combinations of shapes may alternatively be used to represent the geometric volumes of both sound producing objects and sound occluding objects.

In one aspect, a different material is associated with each constituent component or shape of a geometric volume or object, such that one or materials make up the object. In the example of FIG. 3A, object 315B may represent a house having a brick body (shape 30*b*) and a tile roof (shape 35) each being made of a different material. Each material is associated with one or more audio characteristics that may define a sound (to be associated with a sound producing object), or that may define an amount of occlusion (to be associated with a sound occluding object.) Each material may be identified by a material identification such that the associated audio characteristics may be obtained for example via table lookup. The relationships between the materials and their identifications may be stored in a database in memory such as a look up table. The materials may have predefined audio characteristics available in a stored digital asset library. In one aspect, the system allows a designer to select an object with predefined geometric volume and material and to then manipulate the object to assign it a different material.

In one embodiment, to perform volumetric audio rendering, direct-paths are determined for rendering the scene from a listener's perspective (listener's view) into a special framebuffer, having stored therein depth values of the constituent pixels of the 3D scene, normals (normal vectors) to surfaces, and material identifications. In one embodiment, more than one listener's perspective is rendered. Rendering two perspectives allows for simple stereo-separation, while rendering all perspectives from for example corners of a cube gives full audio spatialization. During the rendering process, each output pixel of the virtual scene is analyzed for its material (and hence its associated audio characteristics), resulting in a visibility metric that is used to control the gain of the sound attached to the material. Also during the rendering process, the time-of-flight (e.g., a distance or equivalently a delay) is calculated from the listener to the sound source. In one embodiment, this calculation is performed by integrating the depth values of a surface (material), or by simply calculating the distance from the listener to the centroid of a polygon associated with the surface (material.) In one embodiment, these processes are performed by a graphics processing unit (GPU) to generate a list of materials (e.g., polygons) that are visible from the listener's perspective, as well as associated gains and time and flights (distances.) Those results may then be sent to a central processing unit (CPU) or other suitable digital processor separate from the GPU, that is tasked with processing one or more digital audio signals from a number of samplers (e.g., one sampler per material), where the audio signals are attenuated and delayed according to the results and then mixed down to N loudspeaker channels using panning techniques, HRTF-based techniques, or other solutions, for fully spatialized playback.

Figure 4:
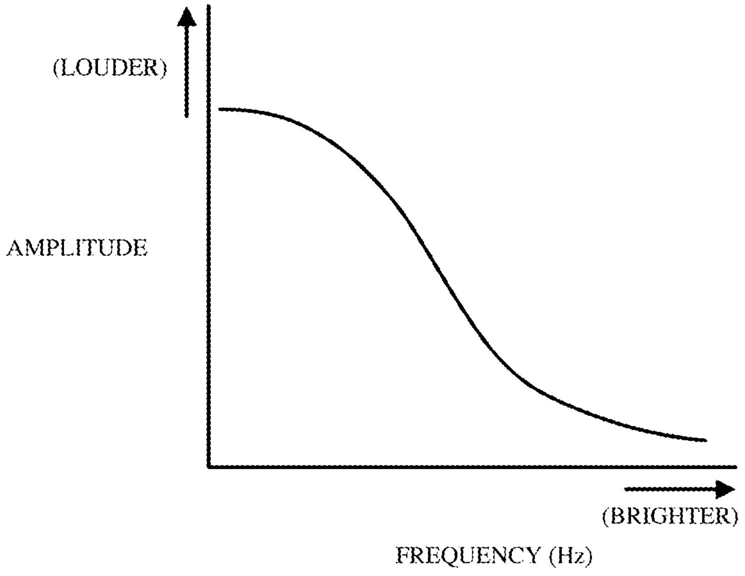
FIG. 4 illustrates a representational view for explaining an example audio characteristic of a sound occluding object.

It is therefore possible to represent sound as a volume, rather than as a point, below the application layer in the audio engine. In this regard, at the application layer, the application receives input regarding an object to be placed in the virtual environment, for example, having a 'geometric volume (e.g., shape, length, etc.), an associated material, and location (e.g., coordinate position in the virtual scene). The object may be the river 210, for example, or a house 215. The material associated with the geometric volume of the river 210 may be associated with an audio characteristic defining a sound of running water (e.g., one or more sound files stored in memory). The material associated with the geometric volume of the house 215 may be associated with an audio characteristic defining sound absorption characteristics. The audio characteristics may also define an amount of attenuation according to length (distance) of a direct sound path in air. FIG. 4 is a representation of one example audio characteristic of a sound occluding object. As shown in FIG. 4, for a material associated with the geometric volume of a sound occluder, an amplitude vs. frequency response dictates that more attenuation occurs as frequency increases. In other embodiments, the audio characteristic of a sound occluder may define that the object blocks sound in all frequencies.

The application also receives input regarding the listener, including a position in the virtual scene. Using the information about the objects in the virtual environment and the listener, it is possible to calculate how the entire river sounds from the perspective of the listener 212A as shown in FIG. 2: there is sound produced by the volumes of the river on each side of the house (e.g., areas 231, 232), and there is filtered sound produced by the volume of the river occluded by the house 215 (e.g., 233). In the case that a sound associated with the river 210 is running water, it is therefore possible to generate sound from the perspective of listener 12A such that the listener 12A hears water from the left area 231 of river 210 which is properly projected to the left side of the listener 212A, water from the right area 232 of river 210 which is properly projected to the right side of listener 212A, and a filtered version of the water from the area 233 which is occluded by house 215 and which is properly projected to the center of listener 212A. In one embodiment, as a listener traverses the virtual scene, the amount of sound projected from each of the areas 231, 232, 233 is modulated by the audio engine without any action by the application, resulting in increased realism.

Although FIG. 2 shows two objects, namely river 210 and house 215, it should be understood that this is merely one example. Other virtual environments may include any number of objects of any type. For example, a virtual environment may have multiple sound producing objects (sources) and multiple sound occluding objects.

By virtue of the arrangement described above, and particularly since the geometric volume of an object is known, it is possible to know how moving the object affects occlusion of the sound. For example, it is possible for an audio engine to determine how to render sound as the volumetric object moves, rotates, changes orientation, or is occluded.

In one embodiment, using a GPU, it is possible to render more sound sources because they are truly "in the virtual scene", such that complexity of designing the audio aspects of a virtual scene is reduced. In addition, by using DSP processing, it is possible to provide full real-time processing which allows for fully dynamic environments. It is therefore possible to create a virtual scene more quickly and more easily as compared to creating a virtual scene using conventional techniques. In addition, the load on the application is reduced since it is the audio engine that may provide the geometric volumes and associated materials of the objects.

In one embodiment, synthesis of a sound may also be considered. For example, an audio characteristic of an object may define a particular algorithm or script for synthesizing a sound. Again using FIG. 2 to illustrate, as a listener moves towards and away from the object, the way that sound is produced by the object is rendered may be changed based on the proximity of the listener to the object. In the example of FIG. 2, if listener is standing farther from river 210 (e.g., listener 212A), the audio characteristic may dictate that the sound produced by the river 210 is running water. The running water sound may be produced by playing back a sound file loop, as one example. However, as the listener moves closer to the river 210 (e.g., listener 212B), the audio characteristic may dictate that the sound produced by the river 210 also includes more detail, such as bubbles and splashing. These additional details may be rendered with additional complexity and granularity over time. These additional details may also be blended, such that the listener does not hear a single element pop in. As such, as a listener moves closer to the river 210, a constant sound of running water may be replaced by a granular synthesis that is more refined in time, such that the level of detail of the sound produced by the sound source is increased and the listener hears additional details. It is therefore possible to increase the complexity of the sound, not only by introducing additional sound elements over time, but also by modifying the manner in which the sound is rendered and the elements are blended. In this case, the sound is therefore said to be synthesized relative to both space and time. The algorithm or script may represent a single synthesis function parametrized by distance between the listener and the sound source. In one embodiment, the algorithm is a continuous synthesis function that continuously renders audio in more and more detail as a listener gets closer to a sound source, for example by increasing complexity of parametrization of the function.

Scripted Audio Level of Detail

In one embodiment, in a scripted audio level of detail process, a sound designer is scripting or authoring procedural audio via a Sound Scripting Language, that defines a procedure for the audio engine to render the sound produced by a given sound source object in the scene. The output script is then stored as a data structure referred to here as a Sound Script. Varying degrees of control logic are provided as part of the audio engine, which modify (via audio signal processing of or audio rendering of) the sound that is produced by a sound source object or that is modified by an occluding object, over time, in accordance with the level of detail (LOD) metrics specified within the Sound Script. These metrics may include information such as distance between the sound source to a listener, solid-angle between the sound source and the listener, velocity of the listener relative to the sound source, a loudness masking amount of the sound produced by the sound source, and current global signal-processing load. Other metrics may include priority of the sound source relative to other sound sources, and the position of the sound source with respect to other objects.

The Sound Script is loaded and run by the higher layer application (e.g., gaming application) when the sound source object in the scene that is associated with that script is loaded. As a listener and the sound source move around the virtual environment relative to one another (as signaled by the higher layer application), e.g., the orientation of the listener changes, LOD metrics are repeatedly updated by, e.g., a 3D audio environment module 765—see FIG. 7, and made available within the Sound Script for dynamic, procedural modification of the audio signal processing (e.g., performed by an audio rendering module 755) over time.

In the embodiment of FIG. 2, when a listener is far away from river 210 (e.g. listener 212A), the Sound Script may play back a baked (or predetermined and fixed) river loop. As the listener however gets closer to the river 210, the river loop may be replaced with a mixed sequence of shorter river loops with more specular detail. And as the listener puts his or her head toward the edge of the river (e.g., listener 212B), the shorter river loops can be replaced with a more granular texture of water droplet sounds and splashing sounds. This evolution of the sound produced by the river 210 was defined by the designer in the Sound Script (associated with the river 210.)

Another example involving scripted audio level-of-detail is as follows. In this example, a helicopter is considered as the sound source. In this scenario, the Sound Script may play a sequence of amplitude-modulated noise bursts to simulate the spinning rotor blades at a particular frequency. As the helicopter moves in closer to a listener, the Sound Script may introduce an engine noise loop (e.g., produced by another sound file stored in a memory).

Figure 5:
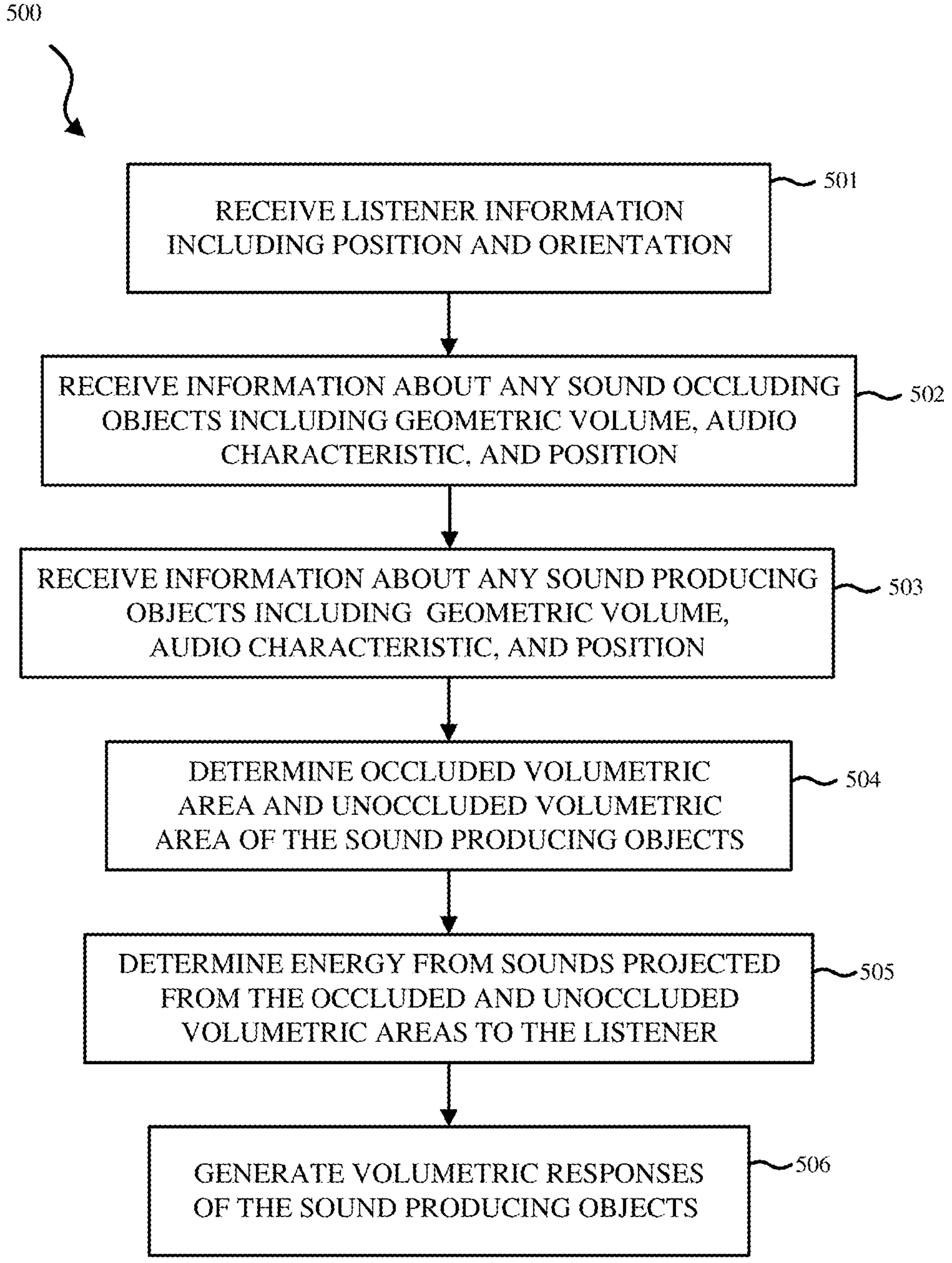
FIG. 5 is a flow chart for explaining volumetric audio rendering according to an example embodiment.

Turning to FIG. 5, a flow diagram is illustrated for explaining volumetric audio rendering. In this regard, the following embodiments may be described as a process 500, which may be depicted as a flowchart, a flow diagram, a structure diagram, or a block diagram. Although a flowchart may describe the operations as a sequential process, many of the operations can be performed in parallel or concurrently. In addition, the order of the operations may be re-arranged. Also, other embodiments may include additional blocks not depicted as part of the flow diagram. In other embodiments, one or more blocks may be removed. A process is terminated when its operations are completed. A process may correspond to a method, a procedure, etc. Process 500 may be performed by processing logic that includes hardware (e.g. circuitry, dedicated logic, etc.), software (e.g., embodied on a non-transitory computer readable medium that is being executed by a digital processor), or a combination thereof.

In the embodiment of FIG. 5, at block 501, listener information is received about a listener (e.g., listener 212A, listener 212B) including a position in a three-dimensional virtual environment and an orientation. The orientation may include, for example, which direction the listener's nose is facing.

At block 502, information is received about any sound occluding objects (e.g., house 215) in the three-dimensional virtual environment. In situations where there are no objects that occlude sound, the process proceeds to block 503. In situations where there are multiple objects that occlude sound, information is received for each of the objects. The information may include a geometric volume of the sound occluding object, one or more materials associated with the geometric volume, and a position of the sound occluding object in the three-dimensional virtual environment. The material defines one or more audio characteristics of the sound occluding object. In one embodiment, the audio characteristic defines (e.g., as a frequency response) how the occluding object attenuates an audio signal. For example, the audio characteristic may define a response in which higher frequency components of an audio signal are attenuated more than lower frequency components of the audio signal.

At block 503, information may be received about a sound producing object (e.g., river 210) in the three-dimensional virtual environment. The information may include a geometric volume of the sound producing object, one or more materials associated with the geometric volume, and a position of the sound producing object in the three-dimensional virtual environment. The material may be associated with one or more audio characteristics of the sound producing object. In one embodiment, the audio characteristic defines a sound to be produced by the sound producing object (as an audio signal). In one embodiment, the audio characteristic defines a script for synthesizing the sound (see, for example, FIG. 6 described below).

In situations where the virtual environment includes more than one sound producing object, information about each of the sound producing objects is received at block 503.

As discussed above in connection with FIG. 3A and FIG. 3B, the geometric volumes (e.g., object 315A, object 315B) of the sound occluding object and the sound producing object may each be comprised of one or more sub-volumes (e.g., shape 30*a*, shape 30*b*). In addition, based on the object information, sub-volumes 36-39 may be generated by the audio engine, by generating simplified volumes bounding the shape of the object (e.g. river 210), such that a designer (user) does not have to perform the task of dividing the object to obtain simpler sound producing areas. In some embodiments, each sub-volume is associated with the same material. In other embodiments, each sub-volume is associated with a different material.

In one embodiment, based on the audio characteristics associated with the materials, each of the objects in the virtual environment may be classified as a sound occluder or a sound source (producer). For example, if a material of an object is not associated with an audio characteristic producing sound, the object is classified as a sound occluder. If a material of an object is associated with an audio characteristic producing sound, the object is classified as a sound source (producer). As previously discussed, the produced sound may be generated from an audio file stored in a memory, may be a mix of sounds, may be synthesized, or it may be any combination thereof. In some examples, an object may be both a sound source and a sound occluder (e.g., a speaker cabinet). In these examples, the object may be associated with both a sound occluding material and a sound producing material. As one example, a sound producing object may be inside of a sound occluding object, e.g., sound emitted through a horn loudspeaker. In the example of a horn loudspeaker, a compression driver at the base of a horn may be considered a sound producing object and the horn may be considered a sound occluder.

In other examples, an object may be associated with a material that has both sound producing and sound occluding properties. As one example, a sound producing object may also be considered a sound occluding object, e.g. a vibrating engine. In the example of a vibrating engine, sound is generated by the engine such that it can be considered a sound producing object and the engine also acts as an occluder to any sound sources that are behind it from the perspective of the listener. In this case, according to one embodiment, the material associated with the geometric volume representing the engine indicates both a sound source and a sound occluder, such that the geometric volume of the engine is processed as both a sound producing object and a sound occluding object. In one embodiment, a run-time algorithm may be configured to perform the audio rendering such that self-occlusion by such an object does not occur.

In one embodiment, a designer may adjust the sound associated with an object or may specify how sound is rendered by a sound source. This is discussed in further detail in connection with FIG. 6 described further below.

Still referring to FIG. 5, at block 504, it is determined, based on the listener information, the sound occluding object information and the sound producing object information, which portion of the geometric volume of a sound producing object (for which the produced sound is projected to the listener) is occluded by the sound occluding object (e.g., area 233). In addition, it is determined which portion of the geometric volume of the sound producing object (for which the produced sound is projected to the listener) will not be occluded by the sound occluding object (e.g., area 231, area 232). Thus, the process determines what sounds can be heard by the listener in the virtual scene. In this regard, the listener is often positioned at or near the graphics camera in the 3D virtual environment. Referring to FIG. 2 as an example, to generate a realistic audio environment, the listener 212A should hear a certain amount of sound coming from area 231 and area 232 of river 210, and a lesser amount of sound from area 233 due to occlusion by house 215. The sound from all of the areas may be attenuated based on (time of flight) distance or an amount of air between the listener and the river 210.

In situations where no sound occluding objects are in the virtual environment, block 504 is not performed and the process proceeds to block 505.

In situations where there are multiple sound producing objects, block 504 is performed or repeated for each of the sound producing objects, relative to a given sound occluding object. In situations where there are multiple sound occluding objects, block 504 is performed or repeated for the sound producing object relative to each of the sound occluding objects. In situations where there are multiple sound producing objects and multiple sound occluding objects, block 504 is performed for each unique pair of sound producing and sound occluding objects. In one embodiment, if there are multiple sound occluding objects in the direct path between a sound producing object and the listener, it is determined, based on the listener information, the information on the sound occluding and producing objects, which portions of the geometric volume of the sound producing object (for which the produced sound is projected to the listener) will be occluded by the multiple sound occluding objects. The process also determines which portions of the geometric volume of the sound producing object (for which the produced sound is projected to the listener) will not be occluded by the multiple sound occluding objects. It may also be determined, based on the audio characteristics of the sound occluding objects, an amount of sound that is attenuated, from the perspective of the listener, due to the multiple sound occluding objects. For example, an amount of sound occluded by a first occluding object and then by the second occluding object may be determined.

At block 505, an amount of energy from the portion of the geometric volume of the sound producing object is determined for which the produced sound (that is projected to the listener) will be occluded by the sound occluding object (e.g., energy of area 233). Also, an amount of energy from the portion of the geometric volume of the sound producing object is determined for which the produced sound (that is projected to the listener) will not be occluded by the sound occluding object (e.g., energies of areas 231, 232).

In situations where no sound occluding objects are in the virtual environment, rather than determining the amounts of energies from occluded and un-occluded portions, an amount of energy from the geometric volume of the sound producing object (or one or more portions of the geometric volume) is determined for which the produced sound is projected to the listener.

In situations where there are multiple sound producing objects and/or multiple sound occluding objects, in one embodiment, contributions from each of the sound producing objects are summed in block 505. In one embodiment, an amount of energy from each of the sound producing objects (or the sum of the contributions) is determined for which produced sound (projected to the listener) will be occluded by one or more of the sound occluding objects. Also, an amount of energy from each of the sound producing objects (or the sum of the contributions) is determined for which produced sound (projected to the listener) will not be occluded by one or more of the sound occluding objects.

At block 506, a volumetric response of the sound producing object is generated based on the determined amount of energies. The volumetric response is used to "evolve" the sound produced by the sound source, to make the sound appear to be coming from the entire geometric volume of the sound source. In situations where the virtual scene includes a sound occluding object, the amount of energy is determined from (i) the portion of the geometric volume of the sound producing object for which the produced sound (projected to the listener) will be occluded by the sound occluding object and from (ii) the portion of the geometric volume of the sound producing object for which the produced sound (projected to the listener) will not be occluded by the sound occluding object. In situations where no sound occluding objects are in the virtual environment, the amount of energy is determined from the geometric volume of the sound producing object (or one or more portions of the geometric volume) for which the produced sound is projected to the listener.

In one embodiment, a head related transfer function (HRTF) is also used in the audio rendering process. In one embodiment, the accumulated energies (from block 505) are summed into a response and (in the frequency domain) multiplied by the HRTF. The HRTF is a mathematical description of the type of filters that need to be applied to right and left ear inputs e.g., left and right headphone driver signals, that make a given sound believably come from different directions around the listener's head. The HRTF may be selected by the audio engine, or may be input by a designer. The designer may also be provided with a list of HRTFs to select from. In one embodiment, the application may select the HRTF based on user input on relevant characteristics of the listener (e.g., height, gender, etc.). The HRTFs may be stored in a database in memory.

In one embodiment, to output stereo signals, a crosstalk cancellation filter may be added after HRTF processing. For example, the volumetric response may be used to render binaural output, where the signals may be post-processed such that the sound appears to be binaural when played back through stereo loudspeakers. Filters may be generated and tuned for each piece of output hardware.

In one embodiment, the volumetric response may be used in a multichannel setup. For example, a Vector-Base Panner may be constructed using a convex hull of a speaker layout with known loudspeaker locations (e.g., azimuth and elevation) in a room. Therefore, instead of left and right HRTF channels for each incoming direction of the volumetric source, there are 2 . . . N pan positions that are blended between, using the Vector-Base Panner constructed from the convex hull of the speaker layout.

It is noted that process 500 considers direct-paths to the listener (e.g., the portion of sound that has not reflected off of other surfaces, or the portion of sound transmitted through or diffracted around an object rather than reflected by it), rather than reverberant paths. In one embodiment, in situations where a listener reaches an edge of a sound occluding object that blocks sound produced from a sound source, a scaling technique may be used along with special enclosing volumes to smooth hard edges on the sound occluding object, such that the listener hears a smooth transition and edge popping artifacts may be avoided.

Figure 6:
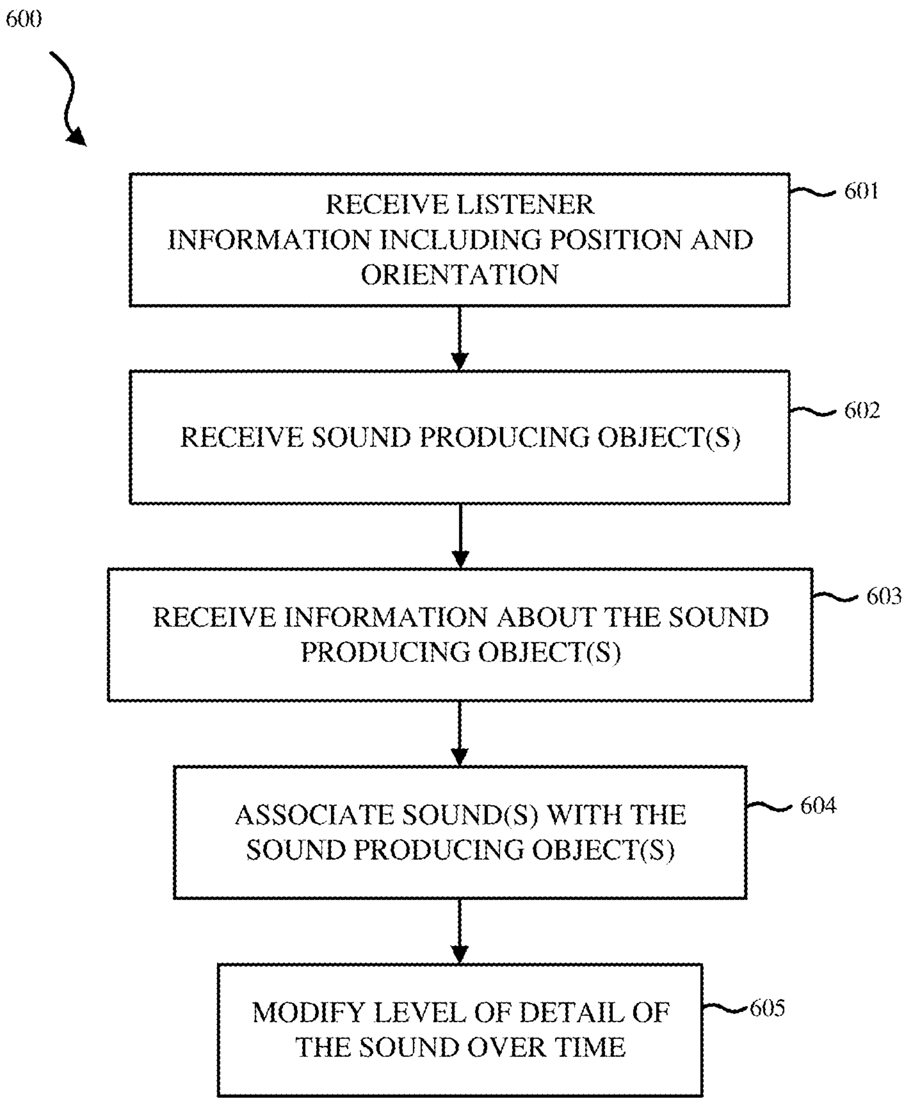
FIG. 6 is a flow chart for explaining audio rendering using scripted audio level-of-detail.

Turning to FIG. 6, a flow diagram is illustrated for explaining audio rendering using scripted audio level-of-detail according to an embodiment herein. Similar to FIG. 5, the following embodiments may be described as a process 600, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. Also, other embodiments may include additional blocks not depicted as part of the flow diagram. In other embodiments, one or more blocks may be deleted. A process is terminated when its operations are completed. A process may correspond to a method, a procedure, etc. Process 600 may be performed by processing logic that includes hardware (e.g. circuitry, dedicated logic, etc.), software (e.g., embodied on a non-transitory computer readable medium), or a combination thereof.

In the embodiment of FIG. 6, at block 601 listener information is received about a listener including a position in the three-dimensional virtual environment and an orientation of the listener's head.

At block 602, a sound producing object that is placed in the virtual environment is received. For example, the object may be input by a designer (e.g., author of a gaming application) for placement in the virtual environment. Since the sound producing object is known, it is possible to analyze the output (e.g., RMS Level) of the sound producing object and provide the loudness of the object as feedback such that the scripted sound output associated with that object may be modified and additional culling may be performed, among other things.

At block 603, information about the sound producing object is received. In one embodiment, this information includes a position of the sound producing object in the three-dimensional virtual environment, which may be input by the designer. In one embodiment, the information includes a geometric volume of the sound producing object. As previously discussed, the geometric volume may be assigned to the object by the designer, or the object may be predefined with an associated geometric volume (e.g., a house may be predefined as having a cuboid volume).

It is noted that in some embodiments, the process may skip block 602 and proceed to block 603 where object information is received. For example, in one embodiment, the virtual scene geometry (e.g., distance, solid-angle, velocity, priority, etc.) may be used without receiving the object itself.

At block 604, one or more audio characteristics is associated with the sound producing object, one of the audio characteristics defining a sound to be produced by the sound producing object. Alternatively, the object may be predefined with an associated geometric volume and material, and the material may be predefined as being associated with an audio characteristic. As previously discussed, the audio characteristics of the material may also be input or modified by a designer. In one embodiment, the audio characteristics may define a sound as a sound element produced by an audio file. In one embodiment, the audio characteristic defines a script for synthesizing the sound of the sound producing object.

At block 605, a level of detail of the sound is modified over time based on a distance between the position of the listener and the position of the sound producing object. In one embodiment, this involves the script defining that a number of sound files used to synthesize the sound is increased per unit time as a distance between the position of the listener and the position of the sound producing object decreases. In one embodiment, this involves the script defining that a number of sound files used to synthesize the sound is decreased per unit time as a distance between the position of the listener and the position of the sound producing object increases.

In one embodiment, modification of the level of detail involves the script increasing a number of parameters for a sound synthesis function such that the sound produced by the sound producing object becomes more granular over time as the distance between position of the listener and the position of the sound producing object decreases. In one embodiment, modification of the level of detail involves the script decreasing a number of parameters for a sound synthesis function such that the sound produced by the sound producing object becomes less granular over time as the distance between position of the listener and the position of the sound producing object increases.

In embodiments where there are multiple sound producing objects, the process of FIG. 6 may be performed for each of the sound producing objects.

Figure 7:
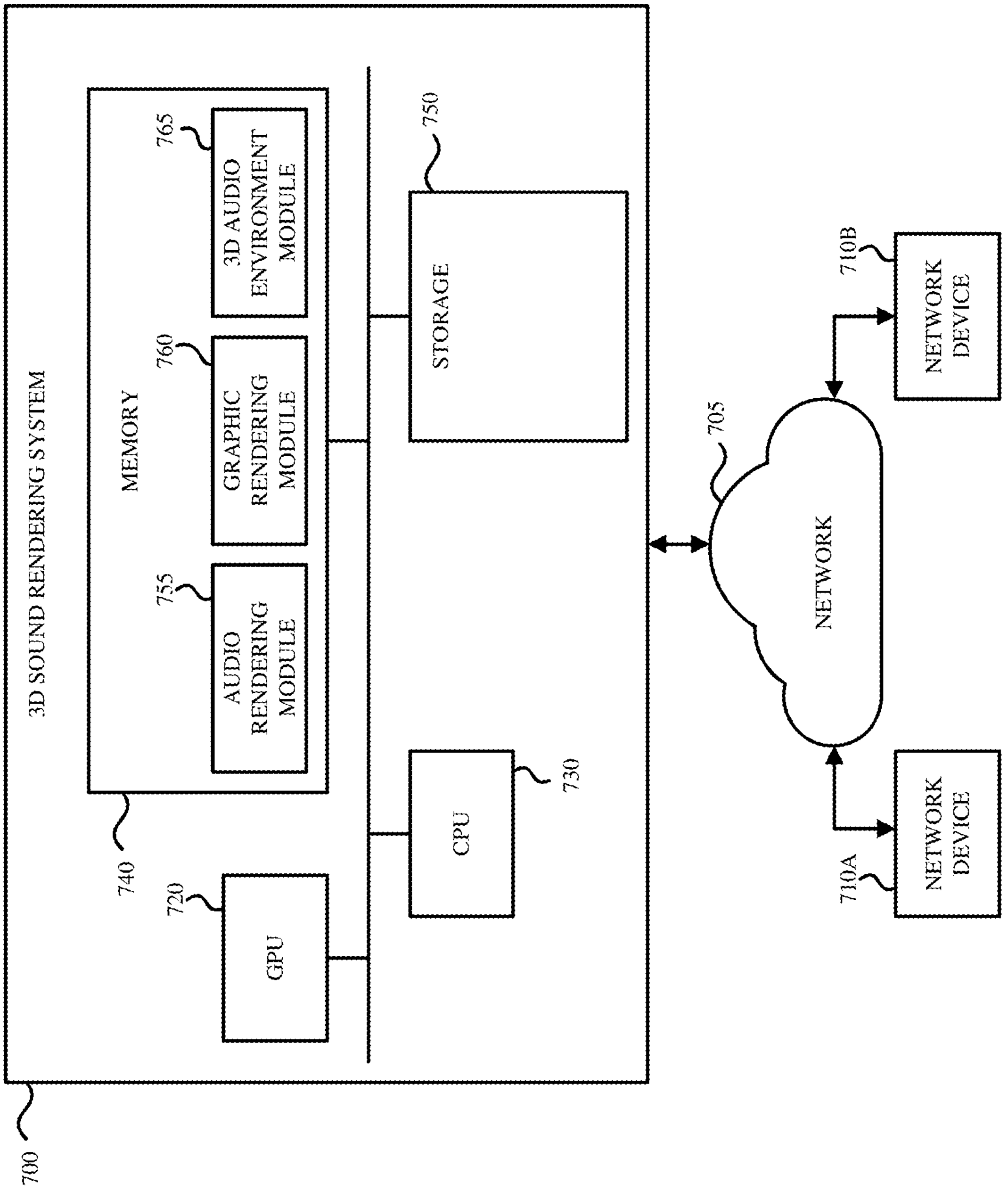
FIG. 7 illustrates an example system for performing 3D audio rendering.

FIG. 7 illustrates an example implementation of a system for performing 3D audio rendering in block diagram form, and an overall view of a network that is capable of supporting rendering of 3D sound, according to one or more embodiments. Specifically, FIG. 7 depicts a 3D sound rendering system 700 that is a computer system which may be connected to other network devices 710A, 710B over a network 705. Network devices 710 may include devices such as smartphones, tablets, laptops and desktop computers, as well as network storage devices such as servers and the like. Network 705 may be any type of computer network, wired or wireless, including a collection of interconnected networks, e.g., the Internet, even though illustrated in FIG. 7 as a single cloud symbol.

3D sound rendering system 700 may include a central processing unit (CPU) 730, and a graphics processing unit (GPU) 720. In various embodiments, computing system 700 may comprise a supercomputer, a desktop computer, a laptop computer, a video-game console, an embedded device, a handheld device (e.g., a mobile telephone, smart phone, MP3 player, a camera, a GPS device), or any other device that includes or is configured to include a GPU. In the embodiment illustrated in FIG. 7, CPU 730 and GPU 720 are included on separate integrated circuits (ICs) or packages. In other embodiments, however, CPU 730 and GPU 720, or the collective functionality thereof, may be included in a single IC or package.

3D sound rendering system 700 may also include a memory 740. Memory 740 may include one or more different types of memory which may be used for performing device functions. For example, memory 740 may include cache, ROM, and dynamic RAM. Memory 740 may store various programming modules (software) during their execution by the CPU 730 and GPU 720, including audio rendering module 755, graphic rendering module 760, and 3D audio environment module 765.

In one or more embodiments, audio rendering module 755 may include an audio framework, such as an Audio Video (AV) Audio Engine. The AV Audio Engine may contain an abstraction layer application programming interface (API) for a sound/audio output system (e.g., a sound card—not shown), such as Open-AL, SDL Audio, X-Audio 2, and Web Audio. It allows its users (e.g., an author of an audio-visual application program, such as a game application) to simplify real-time audio output of the audio-visual application program, by generating an audio graph that includes various connected audio nodes defined by the user, e.g., an author of a game application that contains API calls to the audio rendering module 755, graphic rendering module 760 and 3D audio environment module 765. There are several possible nodes, such as source nodes, process nodes, and destination nodes. A source node generates a sound, a process node modifies a generated sound in some way, and a destination node receives sound. For purposes of this disclosure, a source node may correspond to a sound source object, and a destination node may correspond to a sound listener.

In addition, the various nodes may be associated with characteristics that make its associate sound a "3D sound." Such characteristics may include, for example, scalars that emphasize or deemphasize natural attenuation characteristics over distance, both for the volumetric direct path response and a reverberant response. Each of these characteristics may impact how the sound is generated. Each of these various characteristics may be determined using one or more algorithms, and algorithms may vary per node, based on the importance of the node in an audio environment. For example, a more important node might use a more resource-heavy (computationally heavy) algorithm to render the sound, whereas a less important node may use a less computationally expensive algorithm for rendering its sound.

In one or more embodiments, graphic rendering module 760 is a software program (application) that allows a developer of higher layer applications (e.g., games) to define a spatial representation of the objects, called out in the higher layer application, in a graphical scene (and is responsible for rendering or drawing the visual aspects of 3D or 2D graphic objects in the virtual environment that is being displayed (projected.) In one or more embodiments, such a framework may include geometry objects that represent a piece of geometry in the scene, camera objects that represent points of view, and light objects that represent light sources. The graphic rendering module 760 may include a rendering API like Direct3D, OpenGL or others that have a software abstraction layer for the GPU 720.

In one or more embodiments, memory 740 may also include a 3D audio environment module 765. In one embodiment, 3D audio environment module 765 performs the volumetric audio rendering described in connection with FIG. 5. In one embodiment, 3D audio environment module 765 performs the scripted audio level of detail process described in connection with FIG. 6.

In one or more embodiments, predefined objects and their associated materials and audio characteristics, scripts, and other data structures may be stored in memory 740, or they may be stored in storage 750. This data may be stored in the form of a tree, a table, a database, or any other kind of data structure. Storage 750 may include any storage media accessible by a processor to provide instructions and/or data to the processor, and may include multiple instances of a physical machine-readable medium as if they were a single physical medium.

Although the audio rendering module 755, graphic rendering module 760, and 3D audio environment module 765 are depicted as being included in the same 3D sound rendering system, the various modules and components may alternatively be found, among the various network devices 710. For example, data may be stored in network storage across network 705. Additionally, the various modules may be hosted by various network devices 710. Moreover, any of the various modules and components could be distributed across the network 705 in any combination.

Physical Setting

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

Simulated Reality

In contrast, a simulated reality (SR) setting refers to an entirely or partly computer-created setting that individuals can sense and/or with which individuals can interact via an electronic system. An example of the virtual environment described above is an SR setting. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

Virtual Reality

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Mixed Reality

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

Augmented Reality

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Augmented Virtuality

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Hardware

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio system may be performed by one or more programmable processors executing one or more computer programs stored on a non-transitory computer readable storage medium to perform the functions of the system.

While certain embodiments have been described and shown in the accompanying drawings, it is to be understood that such embodiments are merely illustrative of and not restrictive on the broad invention, and the invention is not limited to the specific constructions and arrangements shown and described, since various other modifications may occur to those of ordinary skill in the art. For example, it will be appreciated that aspects of the various embodiments may be practiced in combination with aspects of other embodiments. The description is thus to be regarded as illustrative instead of limiting.

The invention claimed is:

1. A method comprising:

receiving a listener position in a three-dimensional (3D) virtual environment;

receiving a position of a sound producing object in the 3D virtual environment; and modifying a level of detail of sound of the sound producing object over time and according to a changing distance between the listener position and the position of the sound producing object by changing a script for synthesizing the sound.

2. The method of claim 1, wherein modifying the level of detail of sound comprises increasing a number of sound files used to synthesize the sound or a number of parameters for a sound synthesis function as the changing distance decreases.

3. The method of claim 1, wherein modifying the level of detail of sound comprises decreasing a number of sound files used to synthesize the sound or a number of parameters for a sound synthesis function as the changing distance increases.

4. The method of claim 1, wherein the sound is a first sound associated with the sound producing object, wherein the method further comprises introducing a second sound associated with the sound producing object based on the script when the changing distance between the listener position and the position of the sound producing object is within a threshold.

5. The method of claim 1 further comprising playing back the sound of the sound producing object through one or more speakers, wherein the level of details is modified as the sound is being played back.

6. The method of claim 1 further comprising retrieving the script from memory based on the sound producing object being within the 3D virtual environment.

7. The method of claim 1 further comprising:
receiving an orientation of a listener's head; and
synthesizing, using the script, the sound based on the orientation of the listener's head and the listener position with respect to the position of the sound producing object.

8. An electronic device comprising:
at least one processor; and
memory having instructions stored therein which when executed by the at least one processor causes the electronic device to:
receive a position of a listener in a three-dimensional (3D) virtual environment;
receive a position of a sound producing object in the 3D virtual environment;
synthesize a sound of the sound producing object; and
modify a level of detail of the sound of the sound producing object over time and according to a changing distance between the position of the listener and the position of the sound producing object by changing the synthesized sound.

9. The electronic device of claim 8, wherein the memory has further instructions to retrieve a script associated with the sound producing object from the memory, wherein the sound is synthesized using the script.

10. The electronic device of claim 8, wherein the instructions to modify the level of detail of the sound comprises instructions to increase a number of sound files used to synthesize the sound or a number of parameters for a sound synthesis function as the changing distance decreases.

11. The electronic device of claim 8, wherein the instructions to modify the level of detail of the sound comprises instructions to decrease a number of sound files used to synthesize the sound or a number of parameters for a sound synthesis function as the changing distance increases.

12. The electronic device of claim 8, wherein the level of detail is dynamically modified as the position of the listener or the position of the sound producing object changes within the 3D virtual environment.

13. The electronic device of claim 8, wherein the sound is a first sound that is associated with the sound producing object, wherein the memory has further instructions to synthesize a second sound associated with the sound producing object when the changing distance between the position of the listener and the position of the sound producing object is within a threshold.

14. The electronic device of claim 8, wherein the memory has further instructions to play back the sound of the sound producing object through one or more speakers, wherein the level of details is modified as the sound is being played back.

15. A non-transitory machine-readable medium storing instructions to be executed by at least one processor, wherein the instructions comprise:
receive a position of a listener in a three-dimensional (3D) virtual environment;
receive a position of a sound producing object in the 3D virtual environment;
synthesize a sound of the sound producing object; and
modify a level of detail of the sound of the sound producing object over time and according to a changing distance between the position of the listener and the position of the sound producing object by changing the synthesized sound.

16. The non-transitory machine-readable medium of claim 15 has further instructions to retrieve a script associated with the sound producing object, wherein the sound is synthesized using the script.

17. The non-transitory machine-readable medium of claim 15, wherein the instructions to modify the level of detail of the sound comprise instructions to increase a number of sound files used to synthesize the sound or a number of parameters for a sound synthesis function as the changing distance decreases.

18. The non-transitory machine-readable medium of claim 15, wherein the instructions to modify the level of detail of the sound comprises instructions to decrease a number of sound files used to synthesize the sound or a number of parameters for a sound synthesis function as the changing distance increases.

19. The non-transitory machine-readable medium of claim 15, wherein the level of detail is dynamically modified as the position of the listener or the position of the sound producing object changes within the 3D virtual environment.

20. The non-transitory machine-readable medium of claim 15, wherein the sound is a first sound that is associated with the sound producing object, wherein the non-transitory machine-readable medium comprises further instructions to synthesize a second sound associated with the sound producing object when the changing distance between the position of the listener and the position of the sound producing object is within a threshold.

* * * * *